United States Patent
Cretier et al.

(10) Patent No.: US 12,485,735 B2
(45) Date of Patent: Dec. 2, 2025

(54) OPENING PANEL OF A MOTOR VEHICLE, PROVIDED WITH A PLATE FOR SUPPORTING EQUIPMENT

(71) Applicant: OPmobility SE, Lyons (FR)

(72) Inventors: Romain Cretier, Sainte-Julie (FR); Emilien Hummer, Sainte-Julie (FR)

(73) Assignee: OPmobility SE, Lyons (FR)

( * ) Notice: Subject to any disclaimer, the term of this patent is extended or adjusted under 35 U.S.C. 154(b) by 143 days.

(21) Appl. No.: 18/258,978

(22) PCT Filed: Dec. 20, 2021

(86) PCT No.: PCT/EP2021/086792
§ 371 (c)(1),
(2) Date: Jun. 22, 2023

(87) PCT Pub. No.: WO2022/136274
PCT Pub. Date: Jun. 30, 2022

(65) Prior Publication Data
US 2024/0042838 A1 Feb. 8, 2024

(30) Foreign Application Priority Data
Dec. 23, 2020 (FR) .................................. FR2014043

(51) Int. Cl.
*B60J 5/10* (2006.01)
*B60J 5/04* (2006.01)

(52) U.S. Cl.
CPC ............. *B60J 5/107* (2013.01); *B60J 5/0416* (2013.01)

(58) Field of Classification Search
CPC ... B60J 5/101; B60J 5/107; B60J 5/108; B60J 5/0416; B60J 5/0415; B60J 5/045; B60J 5/0468; B60R 11/04; B60R 2011/0021
(Continued)

(56) References Cited

U.S. PATENT DOCUMENTS

| | | | | |
|---|---|---|---|---|
| 5,281,780 A | * | 1/1994 | Haland | B60J 5/0437 200/52 R |
| 6,019,418 A | * | 2/2000 | Emerling | B60J 5/101 296/146.7 |

(Continued)

FOREIGN PATENT DOCUMENTS

| | | | | |
|---|---|---|---|---|
| EP | 1842708 A1 | * | 10/2007 | ............ B60J 5/0416 |
| EP | 2384917 A1 | | 11/2011 | |

(Continued)

OTHER PUBLICATIONS

Hummer et al. (EP 3674117 A1), machine translation (Year: 2020).*
(Continued)

*Primary Examiner* — Amy R Weisberg
*Assistant Examiner* — Wenwei Zhuo
(74) *Attorney, Agent, or Firm* — M&B IP Analysts, LLC

(57) ABSTRACT

The present disclosure relates to an opening panel of a motor vehicle, comprising: an inner panel, preferably made of plastic; an outer skin, at least partially made of plastic, mounted on the inner panel, and comprising an inner surface facing an outer surface of the inner panel; and an equipment supporting plate covered by the outer skin and mounted directly on the outer surface of the inner panel, said plate being disposed inside an internal volume delimited by the outer surface of the inner panel and by the inner surface of the outer skin.

18 Claims, 5 Drawing Sheets

(58) Field of Classification Search
USPC ....... 296/146.1, 56, 50, 146.8, 146.5, 146.6, 296/146.7; 49/502
See application file for complete search history.

(56) References Cited

U.S. PATENT DOCUMENTS

| | | | |
|---|---|---|---|
| 6,412,852 B1* | 7/2002 | Koa | B60R 13/0206 296/146.7 |
| 6,854,785 B2* | 2/2005 | Simon | B60J 5/0416 296/146.7 |
| 7,410,204 B2* | 8/2008 | Koa | B60J 5/0416 296/152 |
| 10,195,926 B2* | 2/2019 | Sugie | G01S 7/02 |
| 11,850,926 B2* | 12/2023 | Leterrier | B60J 5/107 |
| 12,251,995 B2* | 3/2025 | Leterrier | B60J 5/0415 |
| 2002/0122406 A1 | 9/2002 | Chillariga et al. | |
| 2006/0043764 A1* | 3/2006 | Schroder | B60R 13/0892 296/146.7 |
| 2015/0114081 A1* | 4/2015 | Imoto | G01L 1/02 73/1.57 |
| 2018/0134130 A1* | 5/2018 | Nagaishi | B60J 5/0461 |

FOREIGN PATENT DOCUMENTS

| | | | |
|---|---|---|---|
| EP | 3674117 A1 * | 7/2020 | ............ B60J 5/107 |
| JP | 2015160525 A | 9/2015 | |
| WO | WO-2004060705 A1 * | 7/2004 | ............ B60J 5/0416 |

OTHER PUBLICATIONS

International Search Report for PCT/EP2021/086792, dated Mar. 25, 2022. International bureau of WIPO.
Second Office Action for application No. CN 202110870834.8, dated Oct. 18, 2025. China National Intellectual Property Administration, Beijing, China.

* cited by examiner

[Fig. 1]
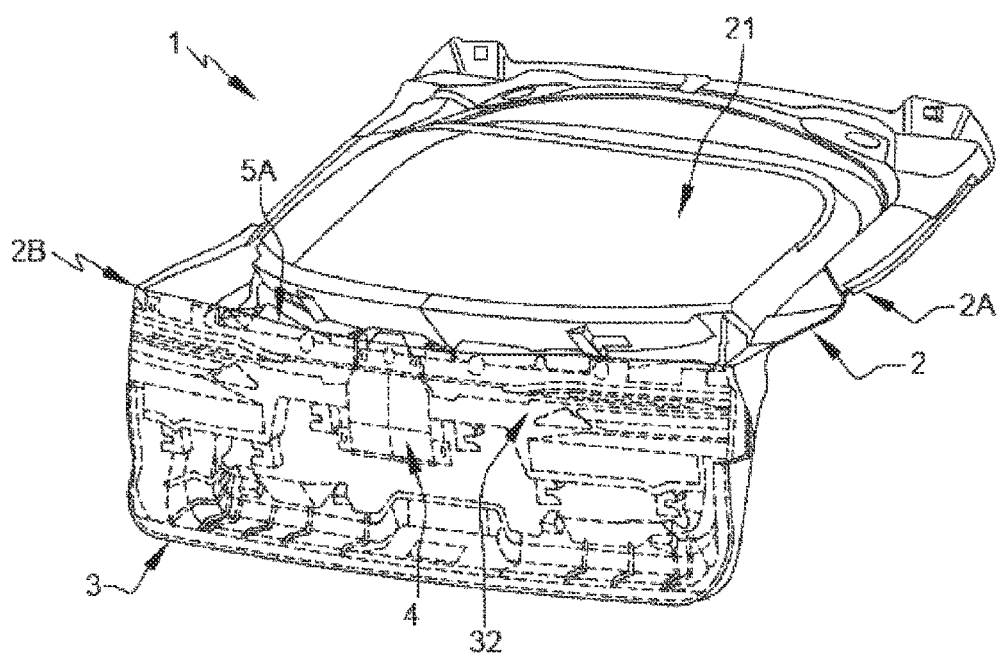

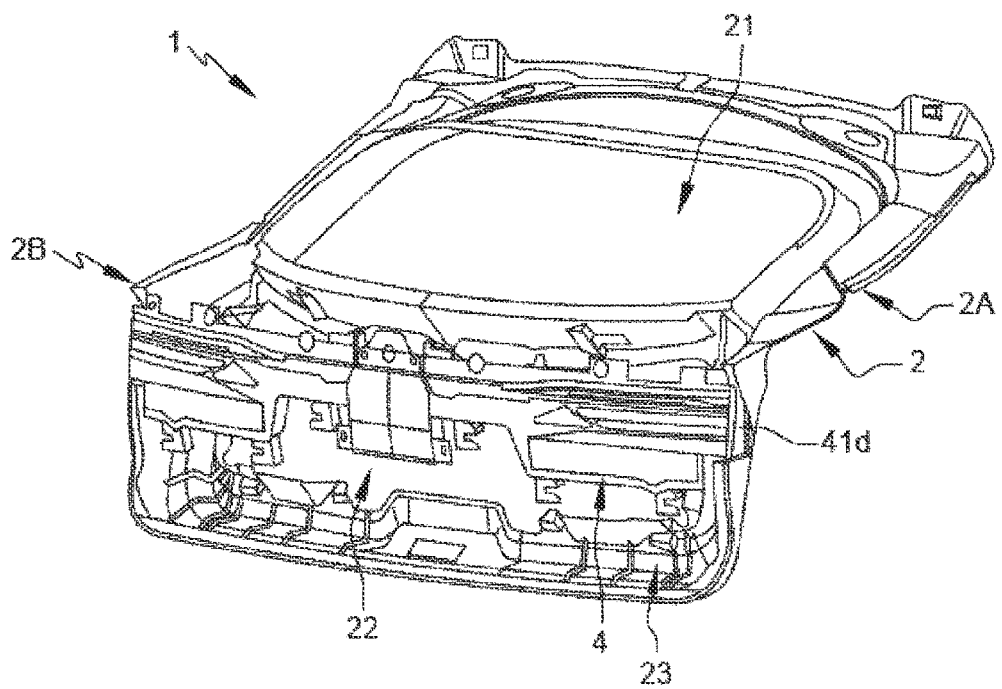
[Fig. 2]

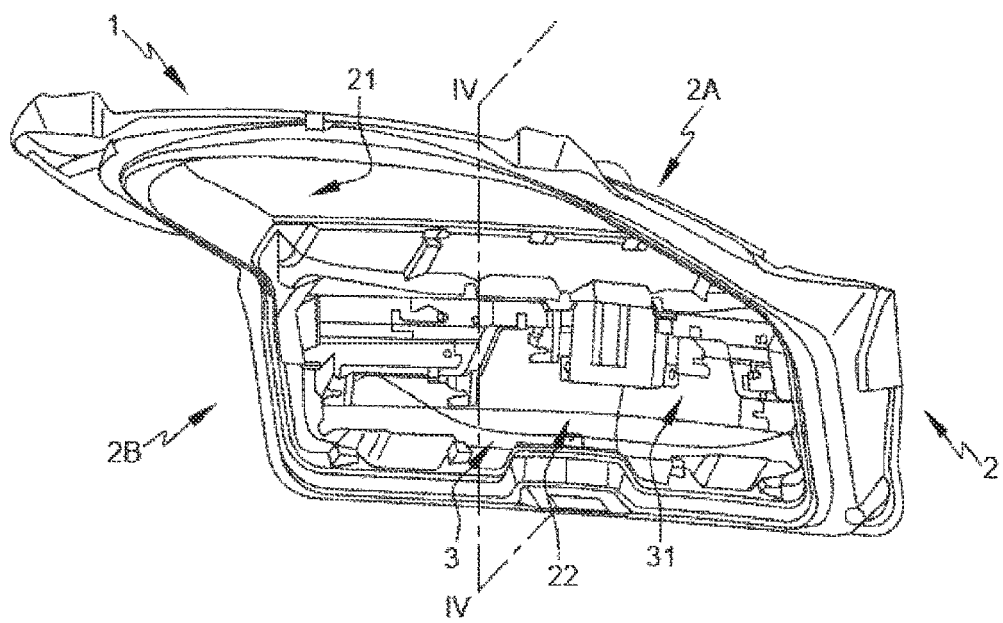
[Fig. 3]

[Fig. 4]
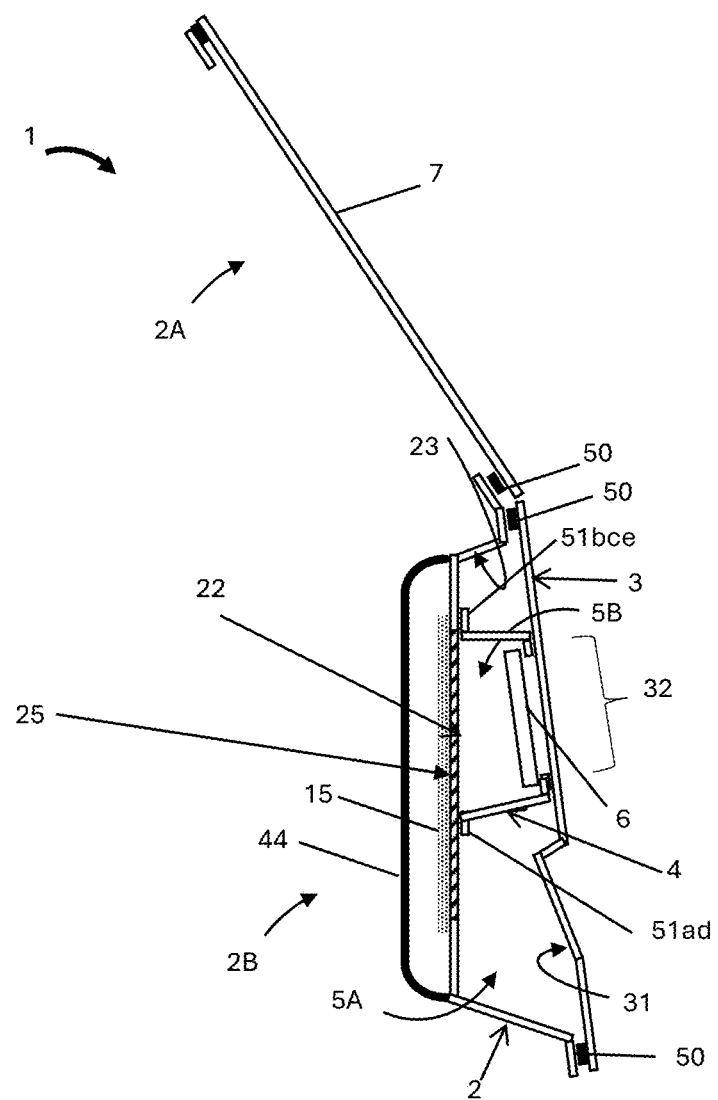

[Fig. 5]
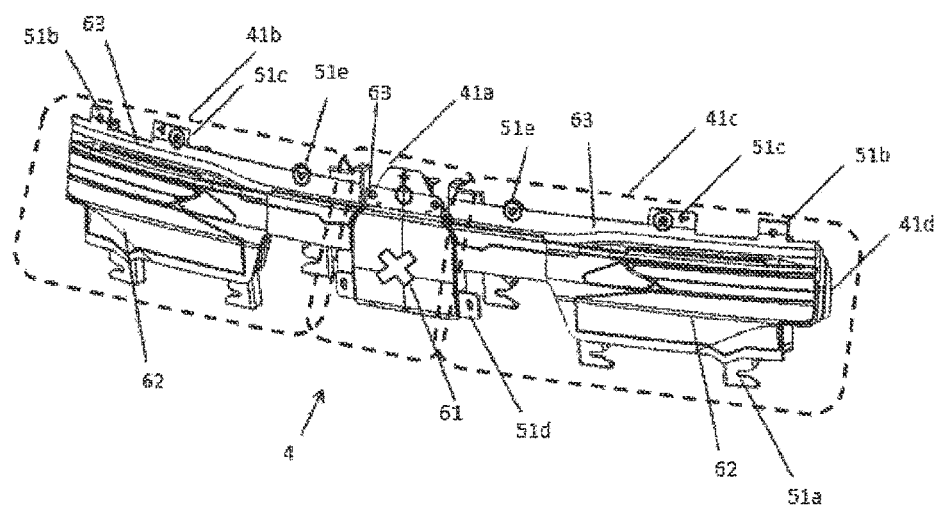

OPENING PANEL OF A MOTOR VEHICLE, PROVIDED WITH A PLATE FOR SUPPORTING EQUIPMENT

The present disclosure relates to the field of motor vehicle bodywork parts, more specifically to opening panels, such as tailgates or side doors, and in particular to the integration of equipment that is installed therein.

For example, a motor vehicle tailgate generally includes an outer panel (also called an outer skin) mounted on an inner panel, or frame. The inner panel is provided with a first opening in the upper portion of the tailgate which is intended to accommodate a window. In the lower portion of the tailgate, this inner panel is generally provided with small cavities that allow local routing for the attachment of components.

On some vehicles, motor vehicle tailgates incorporate, in the lower portion of the tailgate, rear side signal lights, such as brake lights; generally a left light and a right light located symmetrically on either side of the tailgate. Preferably, these two lights are situated as much as possible along the lateral edges of the tailgate so that, when the tailgate is in the closed position, they match up with the complementary rear light situated on the vehicle body. Such lights are currently manufactured by suppliers in the form of light units or optical units. Such optical units includes a rear portion, or housing, in which the lighting device is arranged, and a window, also called a lens, that allows light through when the light is in operation. These two side lights are fitted to and mounted on the tailgate on and via its outer face, which presents a number of drawbacks.

Firstly, it is necessary to provide a protective glass that is sealed relative to the optical housing in order to protect the lighting device. In addition, an operator has to mount the two side lights at two separate locations on the tailgate, connect wiring harnesses thereto, and seal the mounting to prevent runoff water from penetrating into the volume delimited by the inner panel and the outer skin of the tailgate by passing between the light and the outer skin, which presents practical difficulties.

Another drawback lies in the fact that side lights mounted in this way look like they have been added on and do not appear seamless with the rest of the tailgate, which negatively affects its esthetic appearance. Indeed, a trend with automobile manufacturers is to ensure that the various outer surfaces of the vehicle are flush with one another and appear seamless. In some configurations, light elements can even remain partially or completely invisible from the outside, for example when they are not active ("hidden until lit").

Furthermore, in addition to the matter of the side lights, another trend with automobile manufacturers is to incorporate a lighting signature at the rear of vehicles, for example continuous lighting between the side portions of the tailgate. In general, such a lighting device is also mounted via the exterior of the tailgate and can present problems with regard to sealing or not being flush with the rest of the tailgate.

Finally, tailgates can incorporate driver-assistance components (such as radar, lidar, or cameras) or communication components (such as antennas or screens). All of these components have to be incorporated into the tailgate in such a way that, once again, they are sealed and flush with the rest of the tailgate.

All of the technical problems described for the example of the tailgate can be generalized to other types of opening panel, for example side doors into which light elements and other driver-assistance or communication components can also be incorporated between the inner panel and the outer panel.

The object of the present disclosure is in particular to overcome these drawbacks by providing a motor vehicle opening panel that allows the incorporation, in its lower portion, of equipment, in particular radiation emitters and/or receivers, in such a way that they are sealed and the esthetics of the vehicle are improved.

To that end, the disclosed embodiment relates to a motor vehicle opening panel including:
  an inner panel, preferably made of plastic, provided with an upper portion in which a first opening intended to accommodate a window is formed and a lower portion in which a second opening is formed; and
  an outer skin, at least partially made of plastic, mounted on the inner panel, and including an inner surface facing an outer surface of the inner panel.

The opening panel according to the disclosed embodiment further includes an equipment supporting plate covered by the outer skin and mounted directly on the outer surface of the inner panel, said plate being disposed inside an internal volume delimited by the outer surface of an inner panel and by the inner surface of the outer skin.

By virtue of the presence of an equipment supporting plate borne by the inner panel, covered by the outer skin and arranged inside a volume delimited by the outer surface of an inner panel and by the inner surface of the outer skin, it is possible for light devices, communication devices or driver-assistance devices to be borne by the equipment supporting plate instead of attaching them to the outer face of the outer skin of the tailgate, which allows improves the esthetics of the vehicle since the equipment does not look like it has been added on and appears seamless with the rest of the opening panel.

Furthermore, it is also possible to ensure that the equipment borne by the supporting plate is concealed by the outer skin, including, in the case of a tailgate, rear lights, for example when they are not turned on. What is meant by "concealed by the outer skin" is that the equipment is not obviously visible to a user.

It is also easy to access the equipment through the second opening in the lower portion of the opening panel. Additionally, the supporting plate can be incorporated within the delimited volume after the inner panel and the outer skin have been bonded together.

Moreover, the fact that the equipment supporting plate is borne by the inner panel makes it possible to easily place the equipment borne by the supporting plate in a "dry zone." What is meant here by "dry zone" is a closed volume that is sealed relative to the outside environment or at least protected therefrom. This dry zone is produced at least partially by joining the outer skin to the inner panel via a continuous peripheral bead of adhesive. This is much easier than ensuring a seal around each item of equipment individually, such as the light units. This ultimately allows these items of equipment to be protected and therefore the correct operation thereof to be ensured.

Finally, the supporting plate allows the connections for the equipment that it bears to be brought together.

According to other optional features of the opening panel taken alone or in combination:
  the equipment supporting plate includes an electromagnetic radiation emitting and/or receiving device and the outer skin includes, facing the electromagnetic radiation emitting and/or receiving device, at least one transmission zone, made of plastic, which is at least partially transparent to said electromagnetic radiation; the electromagnetic radiation belongs to the visible spectrum;

the electromagnetic radiation belongs to the non-visible spectrum;

the supporting plate further includes an attachment interface for attaching said supporting plate within the internal volume, said interface being configured in such a way that the supporting plate is removable;

the supporting plate includes at least one access port to one of the items of equipment borne by the supporting plate, and preferably at least one member for closing said access port;

the inner panel includes at least one access opening to the delimited volume;

the access opening of the inner panel faces said at least one access port of the supporting plate;

the inner panel further includes at least one removable hatch 25 that allows the access opening to be closed;

the opening panel further includes a trim element attached to an internal wall of the inner panel and covering the second opening;

the trim element covers said at least one removable hatch 25;

the opening panel includes a technical panel mounted on the inner panel and bearing a set of technical elements for the routing or attachment of components, wherein the technical panel bears at least one of the following elements:
holes for routing elements such as wires, linkages, pipes, attachment interfaces, connectors;
attachment interfaces for systems such as a motorized lock or a windshield washer motor; and
shapes for mechanical reinforcement such as ribs or bosses;

the supporting plate is formed as one piece;

the supporting plate is made in multiple portions joined to one another;

the outer skin is made from one of the following materials: polypropylene (PP), polyamide (PA), polyethylene (PE), acrylonitrile butadiene styrene (ABS), polyethylene terephthalate (PET), polystyrene (PS), polycarbonate (PC), polymethylmethacrylate (PMMA), cyclic olefin copolymer (COC), and any combination of these materials;

the opening panel comprises a structural reinforcement element for structurally reinforcing the inner panel, the technical panel preferably constitutes the structural reinforcement element; and the opening panel constitutes a tailgate or a side door.

BRIEF DESCRIPTION OF THE FIGURES

The various disclosed embodiments will be better understood from reading the following description in which the opening panel of the disclosed embodiment is described as a tailgate, this description being given solely by way of example and with reference to the appended drawings, in which:

FIG. 1 is a perspective view from the rear of the vehicle of a tailgate according to one embodiment, FIG. 2 is a perspective view of the tailgate shown in FIG. 1 from which the outer skin has been removed according to an embodiment, FIG. 3 is a perspective view from inside the vehicle of the tailgate shown in FIG. 1, according to an embodiment, FIG. 4 is a schematic cross section along the sectional plane IV-IV in FIG. 3, showing a tailgate according to one embodiment, FIG. 5 is a more detailed depiction of an equipment supporting plate used in an opening panel according to an embodiment, such as a tailgate described in the preceding figures.

DETAILED DESCRIPTION

FIGS. 1 to 4 show a motor vehicle tailgate 1 according to the disclosed embodiments.

Reference is now made to FIGS. 1 to 3, which illustrate one embodiment of a motor vehicle tailgate 1. The tailgate 1 includes:

an inner panel 2, preferably made of plastic, provided with an upper portion 2A in which a first opening 21 intended to accommodate a window 10 is formed and a lower portion 2B in which a second opening 22 is formed; and an outer skin 3, at least partially made of plastic, mounted on the inner panel 2, including an inner surface 31 facing an outer surface 23 of the inner panel 2.

The tailgate 1 further includes an equipment supporting plate 4 covered by the outer skin 3 and mounted directly on the outer surface 23 of the inner panel 2, said plate 4 being disposed inside an internal volume 5A delimited, on the one hand, by the outer surface 23 of an inner panel 2 and, on the other hand, by the inner surface 31 of the outer skin 3.

The area of the outer skin 3 located facing the item of equipment 6 is a transmission zone 32 made of plastic that is at least partially transparent to the electromagnetic radiation from the item of equipment. What is meant by "at least partially transparent to the electromagnetic radiation" is that this transmission zone 32 allows a sufficient quantity of electromagnetic waves through for the item of equipment to be able to carry out its dedicated function correctly and continuously. In the case of a lighting device, for example, this means that the transmission zone 32 allows the light rays emitted by the device through so that they can be seen by an observer outside the vehicle.

The equipment supporting plate 4 is a housing forming a hollow receptacle and the two peripheral edges 41d thereof are accommodated in two correspondingly shaped housings located at the periphery of the inner panel 2. The plate 4 includes an attachment interface the elements 51a to 51e therefrom (referenced in FIG. 5) allow attachment to the inner panel 2. Elements 51b, 51c and 51e, located in the upper portion of the plate 4, allow removable attachment to the corresponding portion of the inner panel 2. Elements 51a and 51d allow removable attachment in the lower portion of the supporting plate 4 (attachments are not visible in the figures). For example, elements 51a and 51d can receive elements of corresponding shapes from the inner surface 31 of the outer skin 3, from the outer surface 23 of the inner panel 2, or still from the technical panel 15. The removable attachments made in the bottom portion of the supporting plate help to stabilize the plate within the tailgate and thus make it possible to avoid play or inaccuracies in mounting that could cause malfunctions in the equipment or nuisance noise when driving the vehicle or during opening/closing the tailgate 1. Consequently, it is possible to simply remove the plate 4 as soon as maintenance on an item of equipment 6 is required. Of course, any attachment means known to a person skilled in the art, for example screwing, riveting, clipping or snap-fitting, that allow the plate 4 to be removably connected to the inner panel 2, can be used One variant of the disclosed embodiments is shown in FIG. 4 as a cross section along the sectional plane IV-IV in FIG. 3.

The plate includes multiple items of equipment 6, only one of which is visible in the cross sections shown in FIG. 4. Of course, the plate can include just one item of equipment 6 or several items of equipment 6 and these can be different from one another (as shown in FIG. 5). For example, there can be one or more lighting devices that emit electromagnetic radiation in the visible spectrum. These lighting devices can be distributed across all or part of the width of the plate 4 in order to create the desired lighting signature. Thus, it is possible to obtain a lighting signature of seamless appearance across the entire width of the tailgate if desired. These items of equipment 6 can also be driver-assistance devices such as, for example, radars (which generally emit electromagnetic radiation of between 20 and 80 GHz), lidars (which generally emit electromagnetic radiation in the infrared spectrum) or rear-view cameras. Finally, it can also be communication equipment items 6, such as screens or antennas. Generally, this equipment can be any device that requires transparency to radiation.

The supporting plate 4 can be formed as one piece, which simplifies the manufacture thereof and avoids steps of joining multiple elements to the inner panel 2. Alternatively, the supporting plate 4 can be made in several portions (41a, 41b and 41c) that are joined to one another (as shown in FIG. 5) either before being placed in the internal volume 5A or after having been placed in the internal volume 5A in succession. This second assembly variant has the advantage of allowing the incorporation of such a plate even when the first opening 21 in the inner panel is small.

As shown in FIG. 5, the plate 4 includes three portions: a middle portion 41a and two side portions 41b and 41c.

The middle portion 4a includes an element forming an illuminated logo 61. The lower area of the side portions 41b and 41c can, for example, form right and left signal lights 62. The upper area of the three portions 41a, 41b and 41c taken together forms a continuous lighting strip 63 across the tailgate 1 which thus produces a lighting signature. This upper portion can also house a large antenna.

In one variant of the present disclosure not shown, the supporting plate 4 is provided with an access port that allows access to the various items of equipment borne by the plate 4, for example for the installation or maintenance thereof. This access port is closed via a closing member. This variant of the disclosed embodiment allows the equipment 6 borne by the plate 4 to be accessed without necessarily having to disassemble the inner panel 2. It is therefore possible to carry out steps of maintenance or calibration on an item of equipment 6 without disassembling the plate 4 while still having the option to disassemble the plate if more substantial maintenance operations require it, such as complete replacement of the plate 4 or one of the portions thereof.

According to the variant illustrated in FIG. 4, the tailgate 1 can further include a technical panel 15 as described in document FR 1358548, which is also mounted on the outer surface 23 of the inner panel. This technical panel can bear a set of technical elements for the routing or attachment of components, for example the wiring harness for the equipment of the plate 4. According to this variant, the technical panel additionally constitutes a structural reinforcement element for structurally reinforcing the inner panel 2, which makes it possible to compensate for any potential mechanical weaknesses caused by the presence of the second opening 22 needed for mounting and removing the plate within and from the volume 5A. The tailgate 1 further includes a trim element 44 attached to the inner wall of the inner panel 2 and covering the second opening 22. The trim element 44 can be attached to the lower portion 2B of the inner panel 2 in a removable manner, for example by riveting, screwing or snap-fitting.

The present disclosure is not limited to the embodiments presented, and other embodiments will become clearly apparent to those skilled in the art.

What is claimed is:

1. A motor vehicle opening panel, comprising:
   an inner panel, provided with an upper portion in which a first opening is formed and a lower portion in which a second opening is formed, wherein the first opening is adapted to accommodate a window; and
   an outer skin, at least partially made of plastic, mounted on the inner panel, having an inner surface facing an outer surface of the inner panel, wherein the inner panel and the outer skin are bonded to define a delimited internal volume,
   characterized in that it further comprises an equipment supporting plate covered by the outer skin and mounted directly on the outer surface of the inner panel, wherein said equipment supporting plate is disposed inside the delimited internal volume after the inner panel and the outer skin have been bonded, and wherein the delimited internal volume is delimited, on the one hand, by the outer surface of the inner panel and, on the other hand, by the inner surface of the outer skin.

2. The motor vehicle opening panel according to claim 1, wherein the equipment supporting plate comprises an electromagnetic radiation emitting and/or receiving device and the outer skin comprises, facing the electromagnetic radiation emitting and/or receiving device, at least one transmission zone, made of a plastic material, which is at least partially transparent to an electromagnetic radiation.

3. The motor vehicle opening panel according to claim 2, wherein the electromagnetic radiation belongs to a visible spectrum.

4. The motor vehicle opening panel according to claim 2, wherein the electromagnetic radiation belongs to a non-visible spectrum.

5. The motor vehicle opening panel according to claim 1, wherein the supporting plate further comprises an attachment interface for attaching said supporting plate within the internal volume of the opening panel, said interface being configured in such a way that the supporting plate is removable.

6. The motor vehicle opening panel according to claim 1, wherein the supporting plate comprises at least one access port to one of items of equipment borne by the supporting plate.

7. The motor vehicle opening panel according to claim 1, wherein the inner panel comprises at least one access opening to the delimited internal volume.

8. The motor vehicle opening panel according to claim 7, wherein the inner panel further comprises at least one removable hatch that is adapted to close the at least one access opening.

9. The motor vehicle opening panel according to claim 1, further comprising a trim element attached to an internal wall of the inner panel and covering the second opening.

10. The motor vehicle opening panel according to claim 9, wherein the trim element covers at least one removable hatch of the inner panel.

11. The motor vehicle opening panel according to claim 1, further comprising a technical panel mounted on the inner panel and bearing a set of technical elements for a routing or an attachment of components, wherein the technical panel bears at least one of the following elements:
- holes for routing elements, wherein the routing elements are at least one of: wires, linkages, pipes, attachment interfaces, and connectors;
- attachment interfaces for systems, wherein the systems are any one of: a motorized lock and a windshield washer motor; and
- shapes for mechanical reinforcement, wherein the mechanical reinforcement is any one of: ribs and bosses.

12. The motor vehicle opening panel according to claim 1, wherein the supporting plate is formed as one piece.

13. The motor vehicle opening panel according to claim 1, wherein the supporting plate is made in several portions joined to one another.

14. The motor vehicle opening panel according to claim 1, wherein the outer skin is made from at least one of the following materials: polypropylene (PP), polyamide (PA), polyethylene (PE), acrylonitrile butadiene styrene (ABS), polyethylene terephthalate (PET), polystyrene (PS), polycarbonate (PC), polymethylmethacrylate (PMMA), and cyclic olefin copolymer (COC).

15. The motor vehicle opening panel according to claim 1, comprising a structural reinforcement element adapted to structurally reinforce the inner panel.

16. The motor vehicle opening panel according to claim 1, further comprising a tailgate or a side door.

17. The motor vehicle opening panel according to claim 1, wherein the inner panel is made of a plastic.

18. The motor vehicle opening panel according to claim 11, wherein the technical panel is adapted as a structural reinforcement element to structurally reinforce the inner panel.

* * * * *